May 5, 1970 R. L. AMANS 3,510,732

SOLID STATE LAMP HAVING A LENS WITH RHODAMINE OR FLUORESCENT MATERIAL DISPERSED THEREIN

Filed April 22, 1968

Inventor:
Robert L. Amans
by [signature]
His Attorney

United States Patent Office 3,510,732
Patented May 5, 1970

3,510,732

SOLID STATE LAMP HAVING A LENS WITH RHODAMINE OR FLUORESCENT MATERIAL DISPERSED THEREIN

Robert L. Amans, Lyndhurst, Ohio, assignor to General Electric Company, a corporation of New York Filed Apr. 22, 1968, Ser. No. 723,157
Int. Cl. H01l 3/00, 1/02
U.S. Cl. 317—234 5 Claims

ABSTRACT OF THE DISCLOSURE

A solid state lamp comprising a silicon carbide p-n junction diode mounted on a header and capped by a hemispherical plastic lens. Within the lens is dispersed rhodamine or other daylight fluorescent material. The cut-off angle within the diode material is thereby increased, and the emission is shifted from the yellow to orange-red or red depending upon the concentration of fluorescent material in the lens.

CROSS-REFERENCES TO RELATED APPLICATIONS

Copending application Ser. No. 685,447, Pat. No. 3,458,779 filed Nov. 24, 1967 of John M. Blank and Ralph M. Potter entitled Silicon Carbide Light-Emitting Diode (similarly assigned) discloses and claims a light-emitting silicon carbide diode.

BACKGROUND OF THE INVENTION

The invention relates to light-emitting diodes or solid state lamps of semiconductor material. Such devices comprise a wide band-gap semiconductor material in which a p-n junction is formed by suitable doping with impurity atoms. Upon application of a forward bias across the junction, electrons flow from the n-side into the p-side, and holes flow from the p-side into the n-side. As electrons and holes recombine, visible light is produced if the band gap is sufficiently large, about 2 electron volts or better.

One commercially available solid state lamp comprises a silicon carbide crystal chip in which the n-type region is nitrogen doped and the p-type region is boron and aluminum doped. The chip is mounted p-side down on a header and light is emitted through the n-type top side. The light from this lamp is yellow with a peak spectral emission at about 5900 A. with a band width at .707 of peak amplitude extending from 5500 to 6300 A.

SUMMARY OF THE INVENTION

The object of the invention is to provide a silicon carbide solid state lamp of the highest brightness possible and having its peak spectral emission in the red region.

There are two properties of silicon carbide which tend to prevent the effective utilization of the internally developed light. Firstly, the relatively high absorptivity of silicon carbide ordinarily dictates that a minimum thickness of material be interposed between the light-generating region, that is the junction, and the light-emitting surface which is the n-face. Secondly, the index of refraction of silicon carbide is quite high, about 2.7. This entails a relatively small critical angle of incidence beyond which all light is totally internally reflected and lost on account of the high absorptivity. By Snell's law:

$$\frac{\sin i}{\sin r}=\frac{N_2}{N_1}$$

where $i$=angle of incidence,
$r$=angle of refraction,
$N_1$=refractive index of original medium, (2.7 for SiC), and
$N_2$=refractive index of new medium (1 for air).

At the critical angle, sin $r$ is 1; therefore, for a ray passing from SiC to air, the critical angle is about 22°. Even light emerging at less than the critical angle is subject to substantial attenuation by boundary reflective loss.

My invention achieves a substantial improvement in effective utilization of the internally developed light by providing over the light-emitting face of the semiconductor crystal a cap or lens of substantially transparent material having an index of refraction intermediate between that of the semiconductor material and air. In a preferred embodiment wherein the crystal consists of silicon carbide, I utilize a hemispherical lens of acrylic resin. This material has an index of refraction of about 1.5 and this causes the critical angle to increase from 22° to about 34°. In the lens is dispersed a fluorescent material which absorbs in the silicon carbide's spectral emission and re-emits at a longer wavelength.

In a preferred embodiment, the organic fluorescent dye rhodamine B is used and dispersed in the light-transmitting acrylic resin. Rhodamine absorbs visible radiation in the yellow region from 4800 to 5800 A. and emits in the orange-red region from 5500 to 7000 A. The silicon carbide becomes at least in part a reflector to the red light and the combination of a plastic lens containing a fluorescent dye achieves unexpectedly high brightness in the red from a silicon carbide solid state lamp.

DETAILED DESCRIPTION

Figure 1:
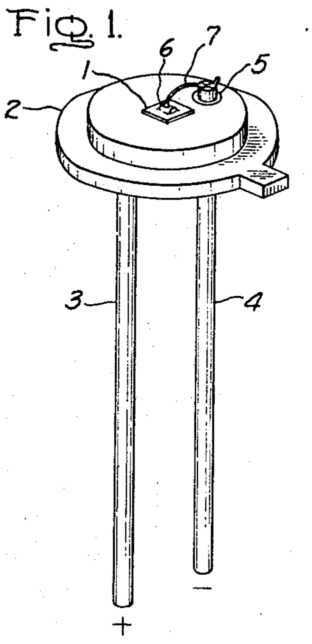
FIGS. 1 and 2 illustrate at successive stages of completion a silicon carbide light-emitting diode or lamp provided with a fluorescent lens cap in accordance with the invention.
Figure 2:
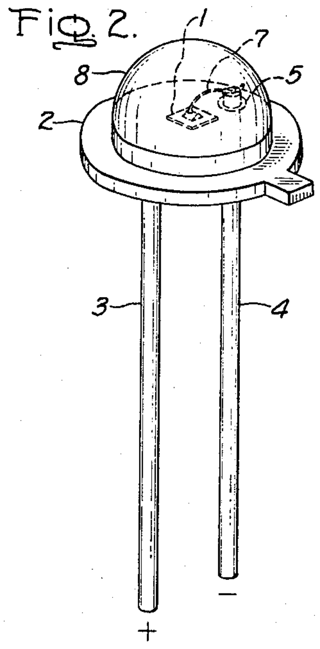

The illustrated light-emitting diode or solid state lamp embodying the invention comprises a crystal chip 1 of silicon carbide mounted on a transistor type header 2. The silicon carbide is suitably doped to form a junction using nitrogen for the donor impurity and boron and aluminum for the acceptor impurity. The header comprises a gold-plated Kovar base disc to whose underside is attached a ground lead wire 3. Another lead wire 4 projects through the disc but is insulated therefrom by a sleeve 5. The silicon carbide chip is conductively attached p-side down to the header disc by means of aluminum silicon alloy. Ohmic contact is made to the n-side by fusing a gold-tantalum alloy in the form of a small dot 6 to the n-type side previous to mounting on the header. After the chip is mounted on the header, a gold wire 7 is bonded, for example by thermocompression, to the alloy dot 6 on the top side of the chip, bent over laterally, and bonded to the top of lead wire 4 projecting through the disc as shown in FIG. 1.

The lens cap is substantially hemispherical and is made of a molded light-transmitting resin, suitably acrylic resin. A fluorescent dye comprising rhodamine B is dissolved in the resin. The cap is molded over the header and the silicon carbide chip and connections are embedded in the resin. Upon setting of the resin the entire assembly is cemented together but the resin, being an insulator, does not affect the electrical characteristics of the device.

Upon application of 3.5 volts D.C. to the diode with the polarity indicated, the input current was 100 milliamperes and the device lit up red with a brightness of 20 footlamberts along the axis of the lens which is also the normal to the n-face of the SiC crystal chip.

Instead of the dye rhodamine, the substances consisting of powdered solid solutions of certain dyes and commercially available as "Day-Glo" materials, such as "Day-Glo Rocket Red" may be used and dispersed in similar fashion in the hemispherical lens 8.

What I claim as new and desire to secure by Letters Patent of the United States is:

1. A solid state lamp comprising a semiconductor crystal chip consisting of silicon carbide containing a p-n junction between an n-type region doped with a nitrogen and a p-type region doped with boron and aluminum, a header whereon said crystal chip is mounted p-side down, means for making ohmic contact to both sides of said crystal chip, and a substantially hemispherical lens of light-transmitting material molded over said header with said crystal chip embedded wherein, said resin containing a fluorescent material responsive to the yellow light produced by said junction and emitting in the orange-red.

2. A lamp as in claim 1 wherein said light-transmitting material is a plastic resin having an index of refraction of about 1.5.

3. A lamp as in claim 1 wherein said fluorescent material comprises the organic dye rhodamine.

4. A lamp as in claim 1 wherein said fluorescent material comprises the commercially available material "Day-Glo Rocket Red."

5. A lamp as in claim 1 wherein said light-transmitting material is an acrylic resin and said fluorescent material comprises the organic dye rhodamine.

References Cited

UNITED STATES PATENTS

| | | | |
|---|---|---|---|
| 3,222,530 | 12/1965 | Kalhammer | 317—235 X |
| 3,300,646 | 1/1967 | Casebeer | 317—235 X |
| 3,359,507 | 12/1967 | Hall | 317—235 X |
| 3,359,509 | 12/1967 | Hall | 331—94.5 |
| 3,389,267 | 6/1968 | Aconsky | 317—235 |
| 3,458,779 | 7/1968 | Blank et al. | 317—234 |

FOREIGN PATENTS

| | | |
|---|---|---|
| 1,044,486 | 9/1966 | Great Britain. |

OTHER REFERENCES

IBM Technical Disclosure Bulletin, Gallium Arsenide Light-Emitting Diode, by Roy et al., vol 7, No. 1, June 1964 pp. 61, 62.

JOHN W. HUCKERT, Primary Examiner

A. J. JAMES, Assistant Examiner

U.S. Cl. X.R.

250—211; 313—108; 317—235